(12) United States Patent
Mawardi

(10) Patent No.: US 6,791,229 B2
(45) Date of Patent: Sep. 14, 2004

(54) THIN FILM SUPERCONDUCTING MOTOR WITH MAGNETICALLY-QUENCHED ROTOR

(76) Inventor: Osman K. Mawardi, 15 Mornington La., Cleveland Heights, OH (US) 44106

( * ) Notice: Subject to any disclaimer, the term of this patent is extended or adjusted under 35 U.S.C. 154(b) by 0 days.

(21) Appl. No.: 09/954,245

(22) Filed: Sep. 17, 2001

(65) Prior Publication Data

US 2004/0155551 A1 Aug. 12, 2004

(51) Int. Cl.⁷ .......................... H02K 55/00; H02K 17/16
(52) U.S. Cl. ...................... 310/211; 310/261; 310/166; 310/52; 505/166
(58) Field of Search ................................ 310/211, 212, 310/168, 52, 61; 505/166, 120, 878; H02K 55/00, 55/04, 17/16

(56) References Cited

U.S. PATENT DOCUMENTS

| | | | | |
|---|---|---|---|---|
| 3,772,543 A | * | 11/1973 | Woodson | 310/52 |
| 3,875,435 A | * | 4/1975 | Fletcher et al. | 310/52 |
| 4,238,715 A | | 12/1980 | Parsch et al. | |
| 4,328,715 A | * | 5/1982 | Gorkov | 475/174 |
| 4,862,023 A | * | 8/1989 | Laumond et al. | 310/261 |
| 4,862,028 A | * | 8/1989 | Dierker et al. | 310/168 |
| 5,325,002 A | * | 6/1994 | Rabinowitz et al. | 505/166 |
| 5,482,919 A | * | 1/1996 | Joshi | 310/52 |
| 6,025,769 A | * | 2/2000 | Chu et al. | 505/211 |
| 6,129,477 A | * | 10/2000 | Shoykhet | 310/261 |
| 6,140,719 A | * | 10/2000 | Kalsi | 310/261 |
| 6,693,504 B1 | * | 2/2004 | Snitchler et al. | 505/705 |

OTHER PUBLICATIONS

Leonard, A., Arch. Elektrotech. vol. 52, (4) pp. 373–385, 1969.
Brechna, H. and Kronig, H., IEEE Trans., vol. MAG–15, pp. 715–718, 1979.
Mawardi, O.K, . IEEE Trans. vol. MAG–23, 587, 1987.
Lipo, T.A., Electr. Mach. Power Syst. vol. 13, (6), pp. 373–385, 1987.
DeDonder, R. and Novotmy, D.W., Electr. Mach. Power Syst. vol. 13, (5), pp. 329–345., 1987.
Tubbs, S.P., IEEE Proc. vol. 137, Pt. B, pp. 120–124, 1990.
Wipf, S.L., Cryogenics vol. 32, pp. 936–948, 1991.

* cited by examiner

Primary Examiner—Burton S. Mullins
Assistant Examiner—Karen Addison
(74) Attorney, Agent, or Firm—Quarles & Brady, LLP; Alexander M. Gerasimow

(57) ABSTRACT

A superconductor motor operates as a squirrel cage induction motor. The rotor is covered with a thin film of superconducting material and the magnetic field created by the stator is strong enough to quench the superconducting material to its normal state at periodic spots on the rotor. This periodic quenching both creates a squirrel cage configuration of superconducting material on the rotor and allows the stator field to penetrate the rotor to induce a current. Once the squirrel cage is "created" by the stator field and a current induced, the motor operates as a conventional squirrel cage induction motor.

23 Claims, 5 Drawing Sheets

THIN FILM SUPERCONDUCTING MOTOR WITH MAGNETICALLY-QUENCHED ROTOR

BACKGROUND OF THE INVENTION

The field of the invention is superconducting motors and specifically induction motors of a type commonly known as squirrel cage motors.

Electric induction motors operate by using a magnetic field produced by a stator to induce a current in a rotor. The stator consists of coil windings distributed around the circumference of the rotor. As these coils are excited with an AC current, a magnetic field that varies with time in a sinusoidal fashion is produced. The peak(s) of this magnetic field travels around the circumference of the stator at a rate determined by the frequency of the AC current and the number of poles in the stator.

If there is no load on the motor, the rotor will turn at the same rate that the magnetic field is rotating around the stator. As the load on the rotor increases, the rotor speed will decrease relative to the speed of rotation of the stator field. The difference in the speed of rotation between the rotor and the stator field induces a current in the rotor, since the stator field is no longer fixed with respect to the rotor. This induced current in the rotor creates its own magnetic field that interacts with the magnetic field produced by the stator to produce mechanical forces. The larger the difference in rotational speed between the rotor and the stator field (known as slip), the more current that is induced in the rotor and consequently the greater the torque produced.

One of the most common types of induction motors is known as a squirrel cage motor. This type of motor gets its name because of the configuration of the windings of the rotor. The windings in which a current is induced consist of bars of electrically conducting material running parallel to the axis of the rotor. These bars are short-circuited at both ends of the rotor by conducting rings. The combination of pairs of bars and end rings are the equivalent of one-turn coils. Their configuration resembles the rotating cage in which squirrels and other animals might exercise, hence the name. Squirrel cage motors are sturdy, simple to construct, and of relatively low cost to manufacture.

The efficiency and torque characteristics of squirrel-cage motors can be improved by using superconducting material in the rotor. An immediate consequence of the use of this material is the elimination of the Ohmic resistance of the conductors of the rotor. This would cause the induced current in the squirrel cage to increase. As a result, more torque would be produced for a given power input, i.e. the motor can be made more compact. There is a definite commercial advantage in using high temperature superconductors (HTS) since these materials exhibit superconductivity at temperatures below 90 degrees Kelvin. The cooling system required to operate at this temperature is considerably less expensive than that needed for the low temperature superconductors that have to be cooled down to temperatures below 10 degrees Kelvin. The materials that act as HTS however, are very brittle.

Unfortunately, two problems are encountered when using a squirrel cage rotor constructed with bars of high temperature superconducting material. The first problem is the difficulty of securing electrical contacts at the junction of the bars and end rings of the squirrel cage that preserve the superconducting properties. Furthermore, assuming that a perfect superconducting rotor cage can indeed be constructed, the "coils" of the squirrel cage rotor would behave as diamagnetic bodies. Hence, they could not be penetrated by the stator magnetic field and no induced current would be able to circulate in the rotor.

BRIEF SUMMARY OF THE INVENTION

The present invention overcomes the two problems mentioned above by finding a simple method of constructing a squirrel cage structure of high temperature superconducting material free of imperfect electrical contacts and by obtaining a means of magnetically linking the superconducting rotor coils to the stator field.

According to the theory of superconductivity, all superconducting materials can be quenched to a normal, non-superconducting state if exposed to a sufficiently strong magnetic field. The value of this "quenching" field varies with the composition of the superconducting material and with the temperature.

Superconducting material that is exposed to a magnetic field stronger then that material's quenching field value will become non-superconducting and will therefore allow that magnetic field to penetrate it. If a portion of otherwise superconducting material is quenched to the normal state by a strong time-varying magnetic field, a current will be induced in that portion. In the present invention a rotating magnetic field strong enough to quench the superconducting material on the rotor of the present invention is used to induce a current in the superconducting material.

Specifically, the present invention consists of a conventional stator with multiphase coil windings to produce a rotating magnetic field in a manner well known in the art. It is thus one object of the invention to produce a magnetic field that rotates around the rotor at a fixed speed. The present invention also includes a cylindrical rotor comprised of a lightweight central portion surrounded by a ceramic shell. On the outer surface of the shell is deposited a thin film of superconducting material. It is thus another object of the invention to provide a lightweight rotor of superconducting material.

The present invention also includes a cryogenic cooling system to cool the rotor to a temperature below which the outer material becomes superconducting. It is thus another object of the invention to maintain the temperature of the rotor below the critical temperature of the superconducting material.

The superconducting material on the rotor of the present invention is chosen to have a reasonably low quenching magnetic field. One HTS compound that exhibits the desired properties is $YBa_2Cu_3O_7$. This compound is quenched to the normal state by a relatively weak magnetic field of the order of 1 Tesla. It is thus another object of the invention to allow the superconducting material to quenched to a normal state by a relatively weak magnetic field.

The operation of the present invention was designed to maintain the simplicity and reliability typical of conventional squirrel cage induction motors while providing higher efficiency by reducing resistive losses in the rotor. First, the motor is cooled to a temperature below the critical temperature of the superconducting material. The rotor is thus superconducting at this point. Second, the stator coils are excited with an AC current to produce a rotating magnetic field. The strength of this field is calibrated so that it is strong enough to cause the superconducting material on the rotor to be quenched to a normal state at periodic places. The regions of this normal state are half a pole pitch apart. Since the magnetic field generated by the stator is rotating around the rotor at the synchronous speed, the quenched regions on the rotor also rotate at the same speed if the rotor is prevented from rotating within the stator. The pattern of the quenched spots on the rotor resembles a conventional squirrel cage where the superconducting strips between the quenched regions and the superconducting regions circling the ends of the rotors are the bars and end rings of the squirrel cage. To ensure the formation of the desired pattern, the axial length of the superconducting material must be greater than that of the stator coils.

Once portions of the superconducting material are quenched to a normal state, the stator field can penetrate these regions. This allows a current to be induced in the non-superconducting regions that can then migrate to the superconducting regions. Thereafter the present invention acts as an induction motor. As the motor begins to rotate, the induced current on the rotor "bars" will decline in frequency. Eventually, equilibrium is reached and the current is stabilized at a slip frequency fixed by the load torque.

The foregoing and other objects and advantages of the invention will appear from the following description. In the description, reference is made to the accompanying drawings that form a part hereof, and in which there is shown by way of illustration, a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
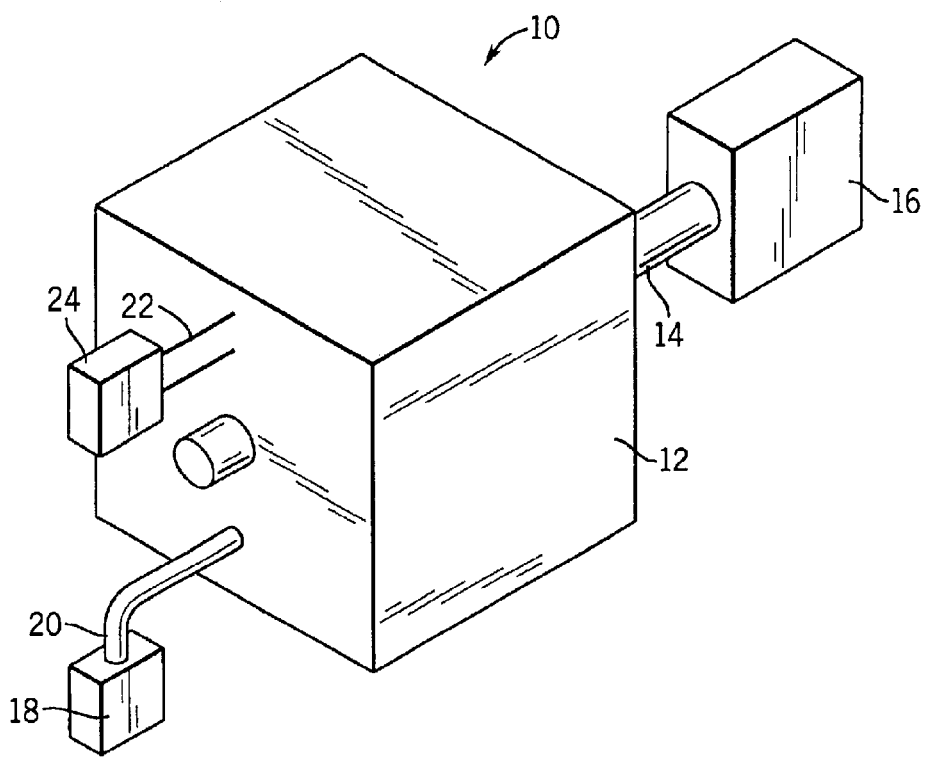
FIG. 1 is perspective side view of an electric motor showing a housing containing a stator and a rotor as well as a cooler and power source.

Referring now to FIG. 1, the present invention is an electric motor 10 connected via a shaft 14 to a machine 16 to which the motor 10 provides mechanical power. The shaft 14 penetrates, at one or both ends, a rectangular housing 12 that forms the outer portion of the motor 10. External to the housing 12 are a power source 24 to supply an AC current through a set of wires 22 that penetrate the housing 12 to connect to a stator (shown in FIG. 2), and a cooler 18 to supply a coolant (not shown) through a tube 20 that penetrates the housing 12.

Figure 2:
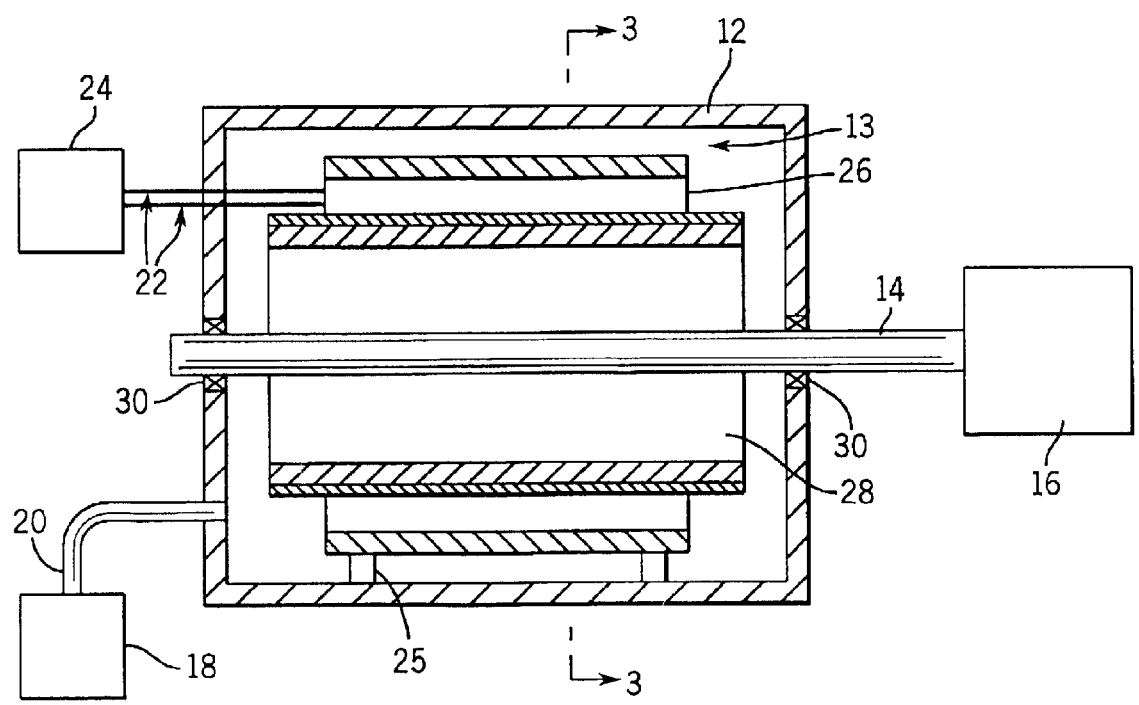
FIG. 2 is a longitudinal cross-sectional view of the present invention showing a cylindrical rotor inside and coaxial with a cylindrical stator, both of which are contained within a housing with openings at both the left and right sides to allow the shaft of the rotor to penetrate the housing and-.connect to an external device to be supplied with mechanical torque by the rotor.
Figure 3:
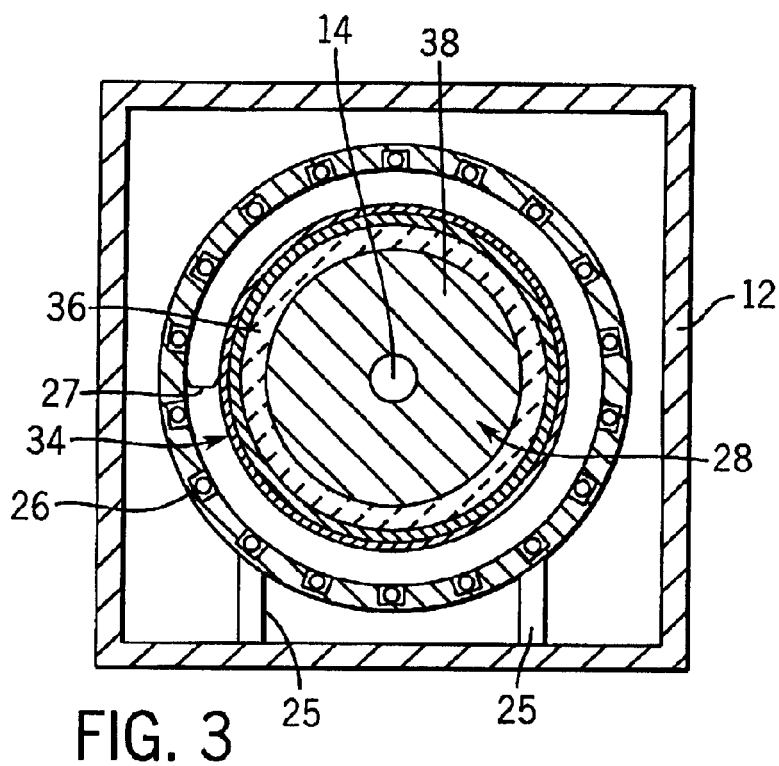
FIG. 3 is a transverse cross-sectional view of the present invention, taken along the line 2—2, FIG. 2, showing the orientation of rotor within the stator and the rotating magnetic field produced by the stator coil.
Figure 4:
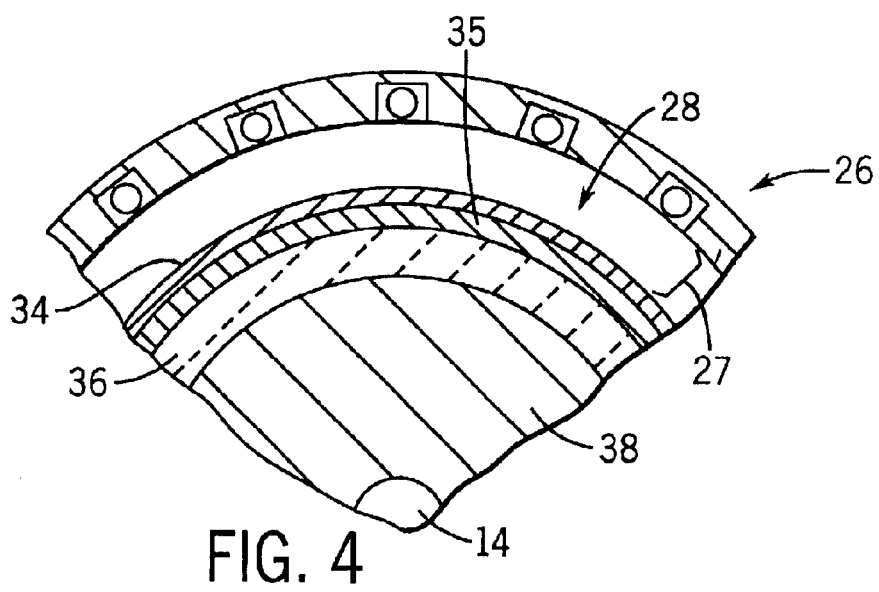
FIG. 4 is a detail view of a portion of the rotor of FIG. 3, showing the various layers of the materials that comprise the rotor.
Figure 5:
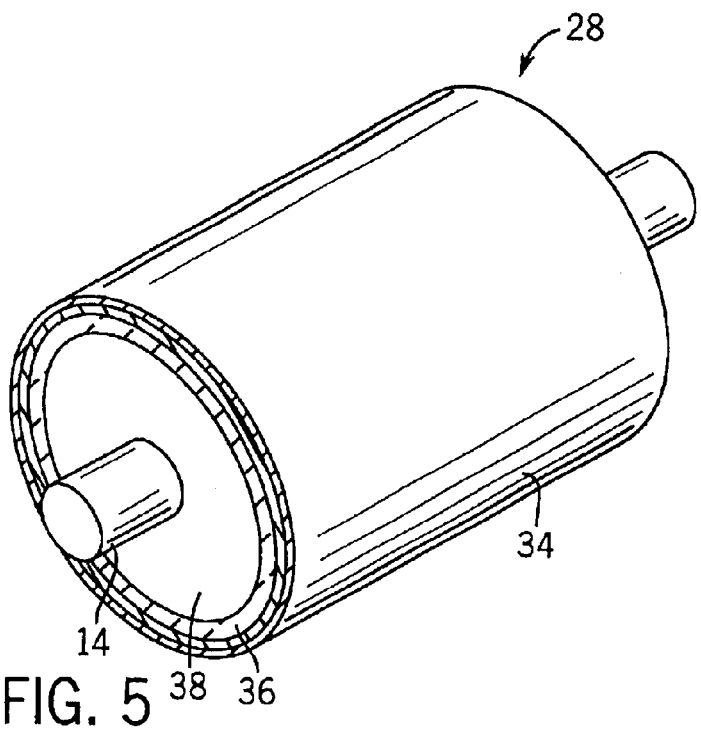
FIG. 5 is a perspective side view of the rotor of FIG. 2, showing the shaft extending beyond the ends of the rotor.
Figure 6:
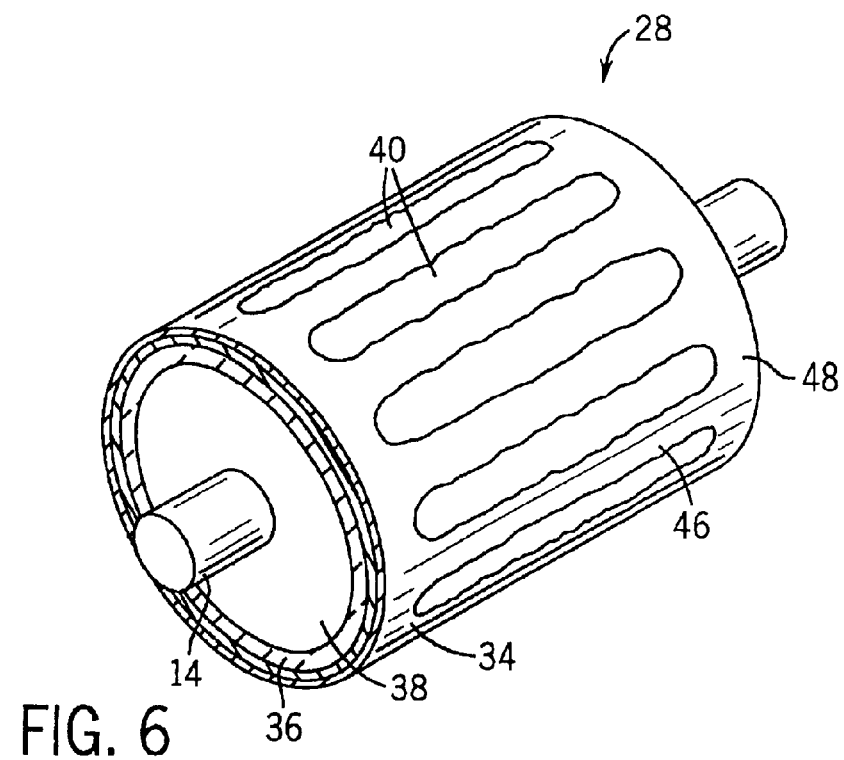
FIG. 6 is the same view as FIG. 5, showing the location of the portions of the superconducting material that are quenched to a normal state by the stator field.

Referring now to FIGS. 2, 3, and 4, the housing 12 surrounds a stator 26 and a rotor 28. The rotor 28 is of a cylindrical shape surrounding and coaxial with the shaft 14 that penetrates the housing 12. A bearing 30 is located at each point where the shaft 14 penetrates the housing 12 to support the rotor 28 and to allow it to rotate relative to the housing 12 while preventing the coolant from escaping. The rotor 28 consists of a cylindrical torque tube 38 surrounding and bonded to the circumference of the shaft 14. The torque tube 38 consists of a stack of laminations of magnetic steel. On the outer circumference of the torque tube 38 is a ceramic shell 36 on which a superconducting film 34 is deposited. The superconducting film 34 is not deposited directly on the shell 36; rather, a substrate 35 is sandwiched between the superconducting film 34 and the shell 36 to provide a mounting surface that is compatible with the structure of the superconducting film 34.

Also inside the housing 12 is a stator 26, coaxial with the rotor 28, comprised of a hollow cylinder of coil windings (not shown). The rotor 28 is located in the interior of the stator 28 and is longer than the stator 26 so that both ends of the rotor 28 extend beyond the ends of the stator 26. The stator 26 is connected to the interior of the housing 12 by supports 25 that fix the position of the stator 26 relative to the housing 12. The rotor 28 is thus able to rotate freely relative to the stator 26 and is not connected to the stator 26 but is separated by an air gap 27.

Referring now to FIGS. 2 and 3, the stator 26 is connected to an AC power source 24 located outside the housing 12 by a set of wires 22 to provide an AC current to the stator 26. The stator 26 is of a type well known in the art. When the stator 26 is excited with an AC current, it generates a magnetic field that varies with time in a sinusoidal fashion. The effect of the sinusoidal variation is the creation of a rotating magnetic field that rotates around the stator 26 at a fixed speed known as the synchronous speed that is determined by the construction of the stator 26 and the frequency of the AC current.

Referring now to FIGS. 5, 6, 7, and 8, the rotor 28 is covered on its outer circumference by a superconducting film 34. If the magnitude of the rotating magnetic field described above exceeds the critical value for the superconducting film 34, then the superconducting film 34 is quenched to a normal state. The size and shape of the quenched regions 40 can be controlled by adjusting the strength of the stator current.

Figure 7:
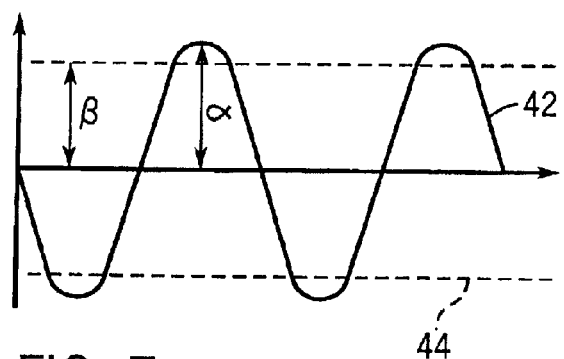
FIG. 7 is a graph showing the magnitude of the stator field at a fixed point in time and the locations where this field exceeds the critical field value of the superconducting material.

Since the magnetic field produced by the stator 26 is a traveling wave that varies with time in a sinusoidal manner, it can be represented at a fixed point in time by a curve 42 that resembles a sine wave. This is illustrated in FIG. 7, where the horizontal axis represents the radial position on the rotor 28, and the vertical axis represents the strength of the magnetic field. The stator current is, adjusted so that the amplitude α of the curve exceeds the critical quenching value β of the superconducting film 34, represented by the broken line 44, only near the peaks and valleys of the sinusoidal curve 42. The width of the quenched regions 40 is thus determined by the area under the curve 42 that is greater than the broken line 44.

Figure 8:
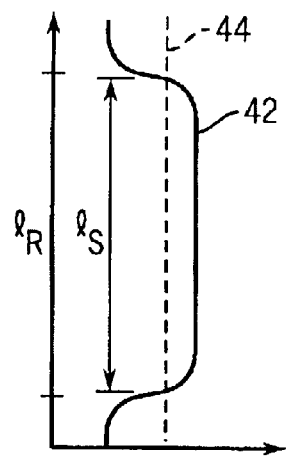
FIG. 8 is a graph showing the longitudinal position of the stator field that exceeds the critical field value of the superconducting material.

FIG. 8 represents the length of the quenched regions 40. In FIG. 8, the horizontal axis represents the strength of the magnetic field and the vertical axis represents the longitudinal position on the rotor 28. The length $l_r$ of the rotor 28 is longer than the length $l_s$ of the stator 26 so that portion the length of the quenched regions 40, defined by the area to the left of the curve 42 that is greater that the broken line 44, does not extend the full length of the rotor 28.

Consequently, the magnetic field generated by the stator 26 creates quenched regions 40 on the surface rotor 28. The quenched regions 40 are in the shape of elongated ellipses whose long axes are parallel to the axis of rotation of the rotor 28. The quenched regions 40 are arrayed around the circumference of the rotor 28 at periodic locations determined by the number of poles on the stator 26. Because the quenched regions 40 are non-superconducting, the area of superconducting film 34 that is superconducting takes the shape of a conventional squirrel cage with bars 46 of superconducting material interspersed between the quenched regions 40 and joined at both ends of the rotor 28 by end rings 48 of superconducting film 34 that cover the entire circumference of the rotor 28.

Because the magnetic field rotates around the stator 26 at the synchronous speed, if the rotor 28 is not rotating, the quenched regions 40 created by the magnetic field will rotate around that rotor 28 at the same speed. The formation of the quenched regions 40 allows the magnetic field to penetrate the superconducting film 34 in the quenched regions 40 and induce a current that circulates in the bars 46 and end rings 48 of the squirrel cage, described above, of superconducting film 34.

Figure 9:
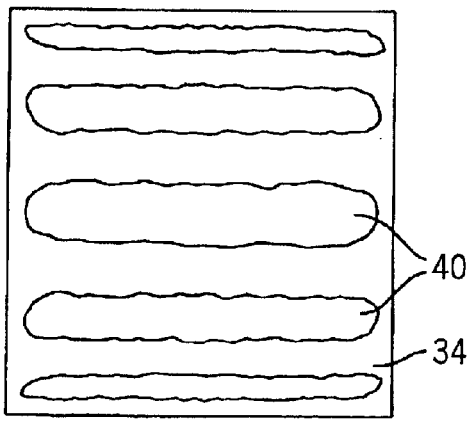
FIG. 9 is a detailed view of a portion of the outer circumference of the rotor showing the orientation of the quenched regions as the stator field instantaneously quenches the superconducting film.
Figure 10:
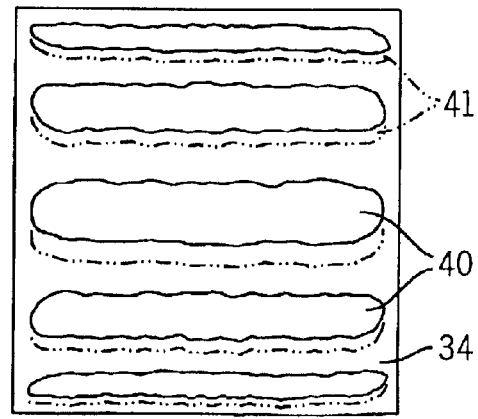
FIG. 10 is the same view as FIG. 9, showing the migration of the quenched regions as the stator field rotates in relation to the rotor.

Referring now to FIGS. 9 and 10, as the stator is switched on to generate a magnetic field sufficiently strong enough to quench the superconducting film 34 to a normal state, quenched regions 40 appear on the outer circumference of the rotor 28. As the stator field rotates in relation to the rotor 28, which is stationary at this point in time, the location of the quenched regions 40 begins to rotate around the circumference of the rotor 28. The quenching magnetic field does not immediately migrate out of the quenched regions 40. Instead, there is a slight delay so that the even when the magnetic field generated by the stator (not shown) is not actively quenching the superconducting film 34, the quenching magnetic field remains in the superconducting film 34, creating residual quenching regions 41. The combination of actively quenched regions 40 with residual quenched regions 41 creates aggregate quenched regions 51 that stretch from the leading edge of the traveling actively quenched regions 40 to the trailing edge of the residual quenched regions 41.

Figure 11:
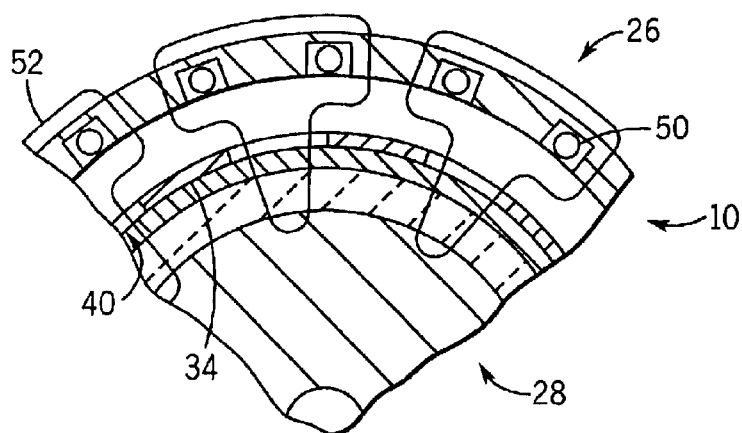
FIG. 11 is a schematic cross-sectional view of a portion of the stator and rotor showing the orientation of the magnetic flux lines at motor startup.
Figure 12:
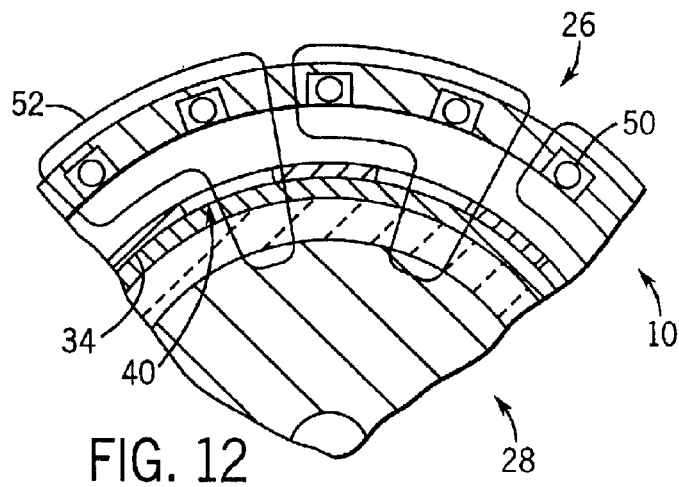
FIG. 12 is the same view as in FIG. 11 showing the orientation of the magnetic flux lines as they begin to migrate into the superconducting regions.
Figure 13:
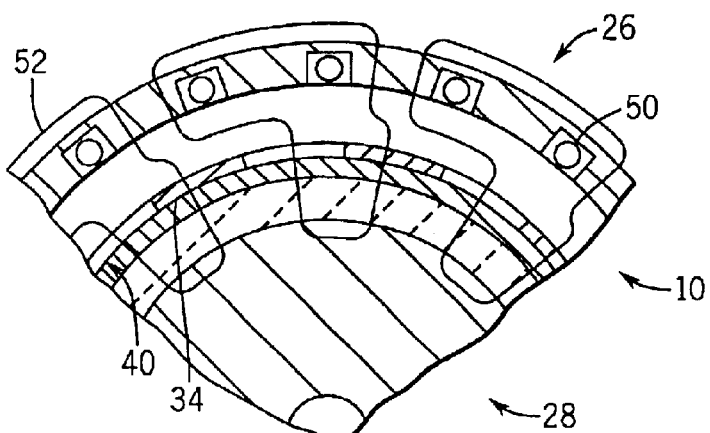
FIG. 13 is the same view as in FIG. 11 showing the increased displacement angle between the rotor and the stator as the rotor reaches its operating speed.

Referring now to FIGS. 11, 12, and 13, the magnetic flux lines 52 created by the stator 26 create quenched regions 40 when the stator 26 is excited by an AC current. At this point, the magnetic flux lines 52 are aligned with the quenched regions 40 on the surface of the rotor 28. As the magnetic flux lines 52 travel around the circumference of the stator 26 at the synchronous speed, the corresponding quenched regions 40 created by the magnetic flux lines 52 are unable to migrate around the rotor 28 at the same speed. Instead, a displacement is created between the location of the magnetic flux lines 52 on the stator 26 and the corresponding quenched region 40 on the rotor 28. As the displacement increases, the magnetic flux lines 52 diffuse out of the quenched regions 40 into the non-quenched portions of the superconducting film 34. As the magnetic flux lines 52 diffuse, the current induced in the quenched regions 40 on the surface of the rotor 28 migrates into the superconducting film 34.

The induced current in the superconducting film 34 on the rotor 28 creates its own magnetic field that interacts with the magnetic flux lines 52 generated by the stator 26, causing the rotor 28 to rotate in the same direction as the rotation of the magnetic flux lines 52 generated by the stator 26. As the rotor 28 rotates, the induced current in the superconducting film 34 on the rotor 28 will be at the slip frequency. As the motor 10 reaches equilibrium, a pull-in torque will cause the rotational speeds of the rotor 28 and the magnetic flux lines 52 generated by the stator 26 to be equal. Under this condition, the circulating current in the superconducting film 34 on the rotor 28 will remain fixed at a value determined by the load on the motor 10 and the strength of the AC current supplied to the stator 26.

What is claimed is:

1. An electric induction motor comprising:
    a) a stator having an armature winding to provide a stator field;
    b) a rotor positioned within the stator field, the rotor comprising a substantially continuous cylindrical layer of superconducting material including periodic superconducting regions and regions quenched by the stator field to provide non-superconducting regions; and
    c) a cooler to cool the superconducting material in the rotor to a temperature below a critical temperature of the superconducting material.

2. The electron motor as in claim 1, further including an A/C drive connected to the stator and generating a magnetic field that rotates around the rotor at a fixed speed.

3. The electric motor as in claim 1, where the superconducting material has a low quenching magnetic field.

4. The electric motor as in claim 1, where the superconducting material is a Yttrium-based compound.

5. The electric motor as in claim 1, where the rotor comprises an inner shaft and a ceramic shell on which the superconducting material is deposited.

6. The electric motor as in claim 1, where a substrate layer is placed between the superconducting material and the ceramic shell.

7. A method of operating an electric motor, whose rotor is covered with a thin film of superconducting material, which comprises:
    a) cooling the superconducting material to a temperature below a critical temperature;
    b) exciting an armature winding in a stator coil with an AC current to produce a rotating magnetic field;
    c) adjusting the intensity of the stator field to produce periodic spots on the rotor that are quenched to normal state;
    d) operating the motor as an induction motor using the current induced in the rotor by the magnetic field of the stator.

8. The electric induction motor as in claim 1, wherein the strength of the stator field is selected to exceed the critical value for the superconducting material.

9. The electric induction motor as defined in claim 8, wherein the stator field creates the quenched regions.

10. The electric induction motor as defined in claim 1 wherein the superconducting material and quenched regions form a squirrel cage configuration.

11. The electric induction motor as defined in claim 1, wherein the superconducting material comprises a thin film.

12. The electric induction motor as defined in claim 1, wherein the superconducting material is provided on an outer surface of the rotor.

13. The electric induction motor as defined in claim 1, wherein the periodic quenched regions are sized and dimensioned to provide spaced superconducting bars along the length of the rotor and a superconducting end ring around the circumference of the rotor at each opposing end of the rotor, the superconducting bars being joined at opposing ends of the rotor by the end rings.

14. The electric motor as defined in claim 1, wherein the rotor comprises:

a torque tube comprising a magnetic material; and a continuous cylindrical layer of superconducting material coupled to the torque tube, wherein the superconducting material is selected to have a critical field that is quenched by an applied rotating magnetic field to provide periodic quenched regions.

15. The electric motor as defined in claim 14, wherein the magnetic material comprises laminations of magnetic steel.

16. The electric motor as defined in claim 14, wherein the layer of superconducting material is provided on an outer surface of the rotor.

17. The electric motor as defined in claim 14, wherein the quenched regions are sized and dimensioned to have a length less than the length of the layer of superconducting material, wherein an end ring of superconducting material is provided at each opposing end of the rotor.

18. The electric motor as defined in claim 17, wherein the end rings of superconducting material are connected by superconducting bars extending across the length of the superconducting material between the quenched regions to from a squirrel cage of superconducting material.

19. The electric motor as defined in claim 14, further comprising a shaft inside and coaxial with the torque tube.

20. The electric motor as in claim 14, where the superconducting material is an Yttrium-based compound.

21. The electric motor as defined in claim 14, wherein the superconducting material comprises a thin film.

22. The electric motor as defined in claim 14, further comprising a cylindrical ceramic shell coupled between the torque tube and the layer of superconducting material.

23. The electric motor as defined in claim 22, further comprising a substrate coupled between the ceramic shell and the superconducting material.

* * * * *